United States Patent
Patey et al.

(10) Patent No.: US 9,747,470 B2
(45) Date of Patent: Aug. 29, 2017

(54) SECURE DATA PROCESSING METHOD AND USE IN BIOMETRY

(71) Applicant: MORPHO, Issy-les-Molineaux (FR)

(72) Inventors: Alain Patey, Issy-les-Moulineax (FR); Julien Bringer, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 74 days.

(21) Appl. No.: 14/774,671

(22) PCT Filed: Mar. 11, 2014

(86) PCT No.: PCT/EP2014/054696
§ 371 (c)(1),
(2) Date: Sep. 10, 2015

(87) PCT Pub. No.: WO2014/140008
PCT Pub. Date: Sep. 18, 2014

(65) Prior Publication Data
US 2016/0026825 A1    Jan. 28, 2016

(30) Foreign Application Priority Data

Mar. 11, 2013 (FR) .................................. 13 52153

(51) Int. Cl.
*G06F 21/32* (2013.01)
*G06F 21/71* (2013.01)
(Continued)

(52) U.S. Cl.
CPC .............. *G06F 21/71* (2013.01); *G06F 21/32* (2013.01); *G06F 21/77* (2013.01);
(Continued)

(58) Field of Classification Search
CPC ..... G06F 21/71; G06F 21/32; H04L 63/0853; H04L 63/0861
See application file for complete search history.

(56) References Cited

U.S. PATENT DOCUMENTS

| | | | | |
|---|---|---|---|---|
| 2009/0161919 | A1* | 6/2009 | Vogler | G06F 21/32 382/115 |
| 2011/0185176 | A1* | 7/2011 | Takahashi | G06F 21/32 713/168 |

(Continued)

OTHER PUBLICATIONS

International Search Report and Written Opinion with English Language Translation, dated Jul. 10, 2014, Application No. PCT/EP2014/054696.

(Continued)

*Primary Examiner* — David Pearson
(74) *Attorney, Agent, or Firm* — Blakely Sokoloff Taylor & Zafman LLP (57) ABSTRACT

The invention relates to a processing method, including the calculation of one function between a datum to be compared and a reference datum. The function can be written in the form of a sum of: a term that depends on the datum to be compared, a term that depends on the reference datum, and a polynomial, such that all the monomials of the polynomial include at least one coordinate of each datum. The method includes an initialization step including: generating masking data; scrambling reference data by means of a server unit on the basis of said masking data; and calculating, by means of a client unit, the term of the function that depends on the datum to be compared. The method also includes steps for executing the calculation of the function between the datum to be compared and the reference datum, indexed by an index c, during which: the client unit sends the coordinates of the datum to be compared to a secure component, which returns said datum, in a masked form, to said component; the (Continued)

client unit retrieves, from the server unit, the reference datum, indexed by the index c and scrambled by the masking data; and on the basis of the data obtained from the secure component and the server unit, the client unit calculates the sum of the term of the function that depends solely on the reference datum and the polynomial term and adds, to said sum, the term that depends on the datum to be compared, such as to obtain the result of the function.

9 Claims, 3 Drawing Sheets

(51) Int. Cl.
*H04L 29/06* (2006.01)
*G06F 21/77* (2013.01)
*G06K 9/00* (2006.01)
*H04L 9/32* (2006.01)

(52) U.S. Cl.
CPC ........ *G06K 9/00885* (2013.01); *H04L 9/3231* (2013.01); *H04L 63/0861* (2013.01); *G06K 2009/00932* (2013.01); *H04L 2209/04* (2013.01); *H04L 2209/50* (2013.01)

(56) References Cited

U.S. PATENT DOCUMENTS

| 2013/0212645 | A1* | 8/2013 | Takahashi | H04L 9/3231 726/3 |
|---|---|---|---|---|
| 2015/0007258 | A1* | 1/2015 | Patey | H04L 9/00 726/1 |

OTHER PUBLICATIONS

French Search Report and Written Opinion, dated Feb. 20, 2014, French Application No. 1352153.

Barni, Mauro, et al., "Privacy-Preserving Fingercode Authentication", *Proceedings of the 12th ACM Workshop on Multimedia and Security*, (Jan. 1, 2010), 231.

Beng, Jin Teoh A., et al., "Cancelable Biometrics Realization With Multispace Random Projections", *IEEE Transactions on Systems, Man and Cybernetics. Part B: Cybernetics*, vol. 37, No. 5, (Oct. 1, 2007), 1096-1106.

Bringer, Julien, et al., "Privacy-Preserving Biometric Identification Using Secure Multiparty Computation: An Overview and Recent Trends", *IEEE Signal Processing Magazine*, vol. 30, No. 2, (Mar. 1, 2013), 42-52.

Erkin, Zekeriya, et al., "Privacy-Preserving Face Recognition", (Aug. 5, 2009), 235-253.

Lagendijk, R. L., et al., "Encrypted Signal Processing for Privacy Protection: Conveying the Utility of Homomorphic Encryption and Multiparty Computation", *IEEE Signal Processing Magazine*, vol. 30, No. 1, (Jan. 1, 2013), 82-105.

Sadeghi, Ahmad-Reza, et al., "Efficient Privacy-Preserving Face Recognition", *International Association for Cryptologic Research*, vol. 20091021:181607, (Oct. 21, 2009), 1-21.

Sarier, Neyire D., "Biometric Cryptosystems: Authentication, Encryption and Signature for Biometric Identities", Retrieved from the Internet: http://d-nb.info/1044870044/34, (Jan. 1, 2011), 1-242.

Sarier, Neyire D., "Practical Multi-factor Biometric Remote Authentication", *Biometrics: Theory Applications and Systems (BTAS)*, (Sep. 27, 2010), 1-6.

* cited by examiner

SECURE DATA PROCESSING METHOD AND USE IN BIOMETRY

FIELD OF THE INVENTION

The field of the invention is that of secure processing of data held by different entities, such that the entities learn no information on the data held by the other entity, the processing comprising calculation of a function between two data held by two different entities.

The invention applies especially to biometric identification and authentication of individuals.

PRIOR ART

In the field of identification (search for correspondence between an individual and a plurality of reference individuals) or biometric authentication (verification of correspondence between an individual and a candidate individual) of individuals, it is common to make a comparison of a biometric datum of an individual to a biometric datum of the same nature, that is, acquired from the same biometric trait, of one or more other individuals.

For this, a function of two biometric data to be compared is calculated, which expresses a rate of similarity between the data. This can be for example the Hamming distance, or the Euclidian distance, between the data.

The Euclidian distance d between two vectors each comprising m coordinates $X=(X_1, \ldots, X_m)$ and $Y=(Y_1, \ldots, Y_m)$ is expressed as follows: $d(X,Y)=\sqrt{\sum_{i=1}^{m}(X_i-Y_i)^2}$.

The calculation of a Euclidian distance between two data determines a degree of similarity between two biometric data of individuals, as the less the Euclidian distance between the data, the more the compared data resemble each other and the greater the probability that they belong to the same individual.

The biometric data which can be used for calculation of a Euclidian distance can be for example digital encoding of faces or digital fingerprints.

In this type of data processing, it is particularly important to secure the operations performed on the biometric data to preserve the confidentiality of these data and identity of the individuals to be compared, and prevent data used for these operations to be learned and exploited by third parties.

This securing involves securing comparative calculations of biometric data, especially so that none of the entities occurring in the calculation obtains information on the biometric data held by the other entities.

To resolve this problem, methods for secure processing of biometric data for comparison of said data have already been proposed. For example, secure calculation methods of Euclidian distances have already been proposed, but these have the disadvantage of needing to use costly cryptographic techniques in broadband calculation times.

PRESENTATION OF THE INVENTION

The aim of the invention is to eliminate the problem stated hereinabove by proposing a secure data-processing method comprising calculation of a function of said data and which is rapid to execute and uses minimal broadband.

In this respect, the invention proposes a secure data-processing method executed by a system comprising a server-unit holding N reference data, a client—unit having a datum to be compared, and the index c of a datum of the base, and a secure component, the method comprising calculation of a function between the datum to be compared and at least one reference datum indexed by the index c, the function being of the type which can be expressed in the form of a sum:

of a term dependent only on the datum to be compared,
of a term dependent only on the reference datum, and
of a polynomial whereof the variables are the coordinates of the datum to be compared and the reference datum indexed by the index c, such that all the monomials of the polynomial comprise at least one coordinate of each datum, the method being characterized in that it comprises an initialisation step comprising:

generation of masking data by the server-unit, or jointly by the server-unit and the secure component, such that masking data are held by the server-unit and masking data are held by the secure component,
integration of the secure component into the client-unit,
scrambling of reference data by the server-unit from said masking data, and
calculation by the client-unit of the term of the function dependent only on the datum to be compared, and in that it further comprises steps for execution of the calculation of the function between the datum to be compared of the client-unit and the reference datum indexed by the index c, during which:

the client-unit sends the coordinates of the datum to be compared to the secure component, which returns it masked from masking data which it holds,
the client-unit retrieves, from the server-unit, the reference datum indexed by the index c scrambled by the masking data, and
from data obtained from the secure component and of the server-unit, the client-unit calculates the sum of the term of the function dependent only on the reference datum and of the polynomial term, and adds to said sum the term dependent only on the datum to be compared to obtain the result of the function.

Advantageously, but optionally, the secure data-processing method further comprises at least one of the following characteristics:

the function is a polynomial function of the coordinates of the datum to be compared and the reference datum indexed by the index c.
Ia function is the squared Euclidian distance between the datum to be compared and the reference datum indexed by c.
the masking data are generated randomly, by the secure component and/or the server-unit, the masking data integrated into the secure component comprising a first set s and a second set r, and the masking data held by the server-unit comprising the first set s, and a third set whereof the elements are the inverse of the elements of the set r.
the recovery step, by the client-unit, of the reference datum indexed by c scrambled from masking data is conducted by oblivious transfer.
Ies reference data and the datum to be compared are biometric data resulting from the digital acquisition of biometric traits of individuals.

The invention also relates to an initialisation method of a secure component, during a secure processing method, comprising:

random generation of data r and s, such that the server-unit holds said data and the secure component holds the set s, and a set whereof the elements are the inverse of the elements of the set r, and the integration of said component to a processing unit forming a client- unit of the server-unit.

A data-processing method is also proposed, executed by a processing unit holding a integer c and a datum, and comprising an integrated secure component, for the execution of the secure processing method described hereinabove, comprising calculation of a function between the datum and at least one reference datum indexed by the index c and held by a server-unit, during which processing unit:
- calculates the term of the function dependent only on the datum,
- obtains, by oblivious transfer with a server-unit, a reference datum held by the server-unit and indexed by the integer c, and scrambled by masking data,
- sends to the secure component the coordinates of the datum which it holds, and receives in response said masked datum, and
- calculates the sum of the term of the function dependent only on the reference datum and the polynomial term, from data obtained from the secure component and of the server-unit, and adds to said sum the term dependent only on the datum to be compared to obtain the result of the function.

Another data-processing method, executed by a processing unit holding N reference data, for execution of the secure data-processing method described hereinabove, comprises the steps during which the processing unit:
- generates masking data and inserts said data into the secure component, or loads onto the component an initialisation key enabling generation by the secure component of pseudo-random numbers, and
- scrambles the reference data from said masking data.

An additional method, executed by a secure electronic component integrated into a processing unit, said component holding masking data, is proposed, during which the electronic component:
- receives from the processing unit all the coordinates of a datum, and
- masks all the coordinates of the datum from masking data, and returns said masked datum to the processing unit.

The invention also relates to computer program products configured to execute the above methods, and processing units configured for said actions.

The invention also applies to a method for authentication or identification of an individual, comprising comparison of a biometric datum acquired on an individual to one or more biometric reference data acquired on listed individuals, wherein each comparison between the datum of the individual and a reference datum is done by execution of the secure data-processing method described hereinabove between the datum of the individual and the reference datum.

The invention finally relates to a system for authentication or identification of an individual, comprising a server-unit comprising a base of biometric reference data of listed individuals, and a client-unit, said client-unit comprising an integrated secure component, the system being adapted to execute the method for authentication or identification described hereinabove.

The client-unit can be an electronic device personal to the individual to be identified or authenticated, and the secure component can be a smart card.

The processing method first proposed is secure since after its execution the server obtains no information on the index held by the client-unit, and the client-unit obtains no information on the data held by the server.

This method is also adapted to use of an integrated secure component in an electronic component, since the secure component, the calculation capacities of which can be limited, conducts simple operations only such as addition and multiplication, which are therefore light on calculation time.

DESCRIPTION OF FIGURES

Other characteristics, aims and advantages of the present invention will emerge from the following detailed description with respect to the appended figures, given by way of non-limiting examples and in which.

DETAILED DESCRIPTION OF AT LEAST ONE EMBODIMENT OF THE INVENTION

Figure 1:
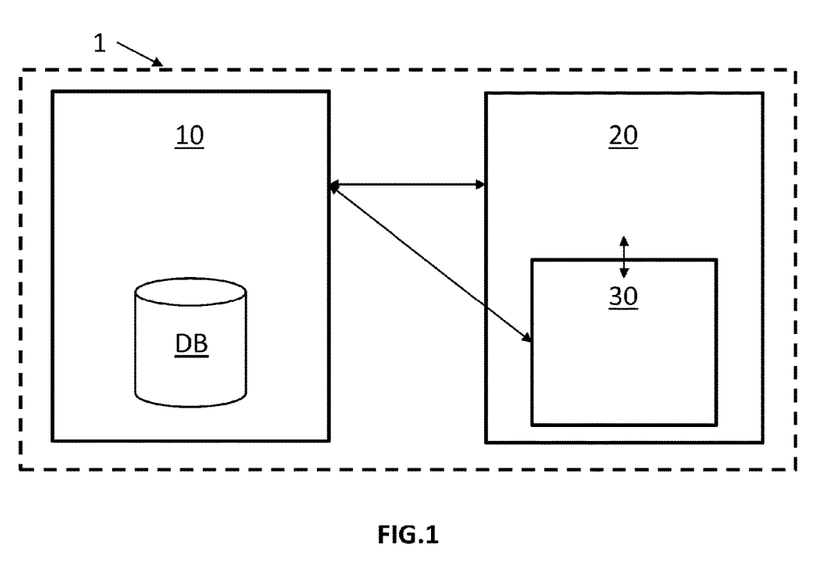
FIG. 1 illustrates an exemplary embodiment of a system for secure data processing.

In reference to FIG. 1, a system 1 configured for executing data processing comprising secure calculation of a function comprises a processing unit, hereinbelow called server-unit 10, comprising for example a database DB, comprising a number N of data $(x_1, \ldots, x_N)$, N being greater than or equal to 1. Each datum $x_i$ comprises m coordinates $x_{i,1}, \ldots, x_{i,m}$, m being greater than or equal to 1.

The system 1 also comprises a processing unit 20, client of the server-unit, having a datum y comprising n coordinates $y_i$, and an index $c \in \{1, \ldots n\}$ of a datum $x_c$ of the base to which it wants to compare the datum y.

The datum y and the data $x_i$ of the database are advantageously biometric data acquired from biometric traits of individuals and can be for example digital representations of faces of individuals, or even encoding of digital fingerprints, such as found in the following publications respectively:

M. A. Turk and A. P. Pentland, <<*Eigenfaces for Recognition*>>, Journal of Cognitive Neuroscience, 3(1):71-86, 1991, and A. K. Jain, S. Prabhakar, L. Hong, S. Pankanti: <<*Fingercode: A Filterbank for Fingerprint Representation and Matching*>>. CVPR 1999:2187.

In all cases, the data y and $x_i$ are biometric data acquired from the same type of biometric trait (digital fingerprint or face, in the above examples).

Last, the system 1 comprises a secure component 30, which is initialised by the server-unit as described hereinbelow, before being integrated into the client unit 20. The secure component is supposed to be inviolable. By way of preferred example, the secure component can be a smart card, such as a SIM card.

The client-unit can be an electronic device personal to an individual, for example to the individual from whom originates the datum y, that is, held only by the latter. For example, in the event where the secure component 30 is a SIM card, the client-unit is advantageously a mobile phone.

Alternatively, the client-unit can be a thirdparty electronic device, such as for example a provider of services to individuals, and especially to the individual from whom the datum y originates.

This system can especially be a system for authentication or identification of an individual, which compares a biometric datum y of an individual to one or more biometric data of reference individuals to set up correspondence between the individual and one of the reference individuals.

Comparison between two biometric data is then made by calculating the Euclidian distance between the datum of the individual and one of the biometric data to which it is compared.

The comparison terminates with correspondence between the individuals from whom the biometric data originate if a Euclidian distance obtained is under a predetermined threshold $\epsilon$.

For example, to authenticate the individual, its datum y is compared to a datum $x_c$ held by the server-unit by calculation of the Euclidian distance. If this Euclidian distance is less than the threshold $\epsilon$ then the individual is considered as being the individual on whom the datum $x_{i_o}$ has been acquired.

Figure 2:
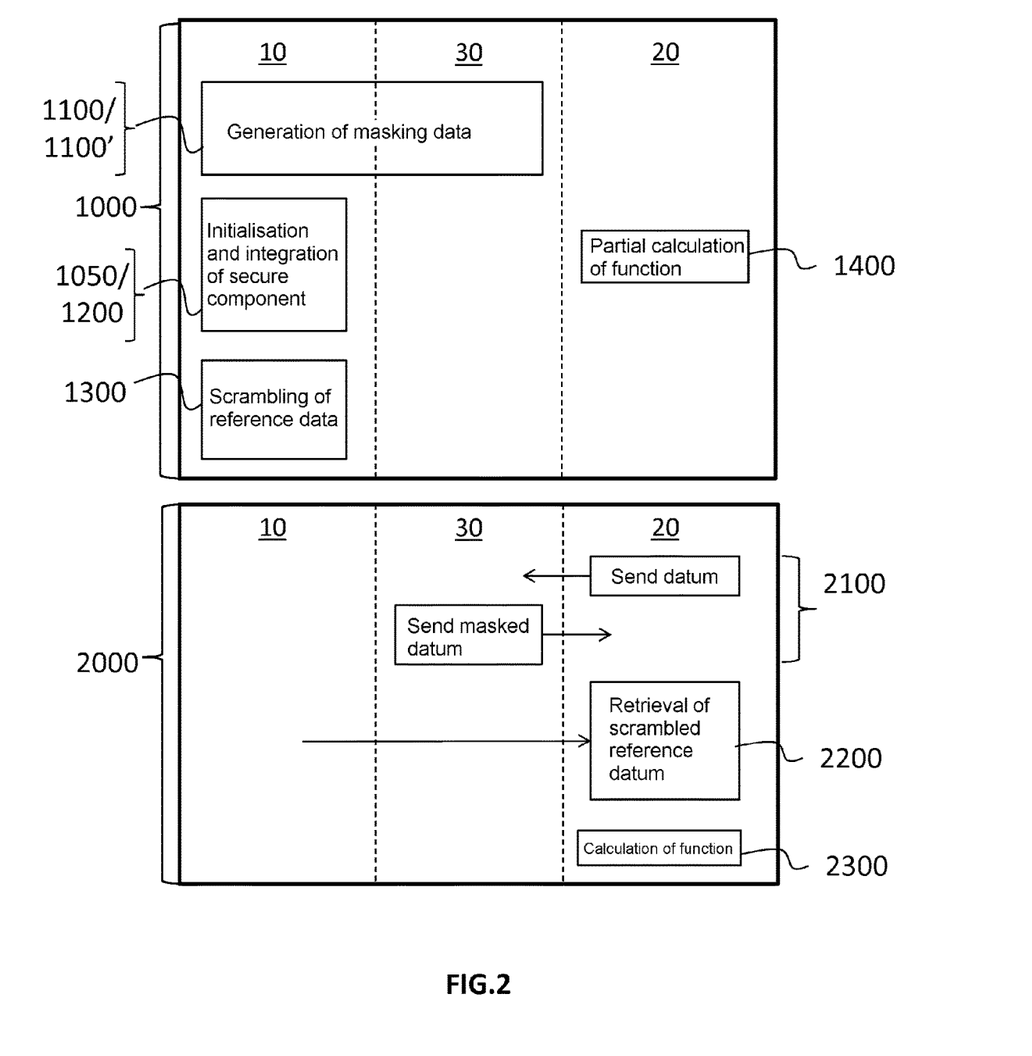
FIG. 2 schematically illustrates the principal steps of a proposed data processing method.

In reference to FIG. 2, the principal steps of a data-processing method are shown. This data processing comprises calculation of a function f(X,Y) of two variables X and Y, the variables comprising respectively m and n coordinates, the function of which can be expressed in the form of the sum:
- of a term $f_1$ (X) dependent only on the first variable,
- of a term $f_2$(Y) dependent only on the second variable, and
- of a polynomial, such that all the monomials of the polynomial comprise at least one coordinate of each datum.

This function is therefore expressed as:

$$f(X, Y) = f_1(X_1, \ldots, X_m) + f_2(Y_1, \ldots, Y_n) + \sum_{|I|>0, |J|>0, |I|+|J| \leq t} e_{IJ} X_{(I)} Y_{(J)}$$

where the $X_i$ and $Y_i$ are respectively the coordinates of the variables X and Y, and I=(1,$i_1$), . . . , (m,$i_m$), J=(1,$j_1$), . . . , (n,$j_n$), $X_{(I)}=X_1^{i_1} \times \ldots \times X_m^{i_m}$, $Y_{(J)}=Y_1^{j_1} \times \ldots \times Y_n^{j_n}$, $|I|=i_1+ \ldots +i_m$ and $|J|=j_1+ \ldots +j_n$.

Advantageously, the function f is a polynomial function. For example, it can be a polynomial function of degree 2. Preferably, the function f is the squared Euclidian distance, such as $f(X,Y)=\sum_{i=1}^{m}(X_i-Y_i)^2$. In this case the reference data and the datum Y comprise the same number m of coordinates.

The processing method comprises an initialisation step 1000, which comprises the generation of masking data 1100. According to a first embodiment of this step, the masking data are generated by the server-unit 10.

These data comprise a first set r={$r_{IJ}$} of elements $r_{IJ}$ selected randomly from the set of integers modulo p $\mathbb{Z}_p$, p being a prime number, for I,J such as $e_{IJ} \neq 0$, and a second set s={$s_{IJ}$} for the same I, J.

According to this embodiment, during a step 1200, the server-unit initialises a secure component 30 by loading masking data into said component, and by integrating the component into a client-unit.

The masking data loaded into the secure component are the set s, and a set of indexed elements equal to the inverse of the corresponding elements of r. For example, by noting r* this set, $r^*_{IJ}=1/r_{IJ}$.

Alternatively, the secure component 30 comprises a generator of pseudo random numbers. The generation step of masking data 1100' is then preceded by a step 1050, during which the server-unit 10 loads into the secure component an initialisation key serving to generate the pseudo-random numbers. During this step, the server-unit can also integrate the secure component into the client unit (corresponding to the previous step 1200).

The generation step of masking data is conducted at the same time by the secure component 30 and by the server-unit 10, the latter also having the initialisation key. The masking data generated by the secure component and by the server-unit 10 are the same since they are obtained from the same initialisation key. These can be sets s and r, and the secure component deduces therefrom the set r*, or inversely they can be sets s and r*, and the server-unit deduces therefrom the set r. This variant has the advantage of generating several sets of masking data by the same secure component to iterate the method several times.

Advantageously, irrespective of the embodiment, several sets of masking data s and r* are generated and if needed integrated into the secure component to allow the latter to execute the method several times.

In the event where the secure component comprises a generator of pseudo-random numbers, the different sets of masking data can be generated only from a single generation key.

From the masking data and during a step 1300, the server-unit scrambles the set of reference data of the base, by calculating for each reference datum $x^l$ a datum $\tilde{x}^l=\{x_{(I)}^l r_{IJ}\}_{I,J}$ and a coefficient:

$$\alpha_l = \sum_{I,J} e_{IJ} x_{(I)}^l r_{IJ} s_{IJ} - f_1(x^l)$$

During a step 1400, the client-unit calculates from the datum y which it has the term $f_2(y)$ of the function to be calculated. Calculation of this term is possible since, as indicated hereinabove, it depends only on the datum y.

The method then comprises an execution step 2000 of calculation of the function f. Advantageously, if the data-processing method is executed several times, each time calculating the function f between the datum y and a datum of the base, the initialisation step 1000 hereinabove is conducted only once for all comparisons made.

However, the execution step 2000 described hereinbelow is conducted for each comparison. During a first step 2100, the client-unit sends to the secure component all the coordinates of the datum y. From coordinates and masking data which it holds, the secure component sends the masked datum Y back to the client-unit in the form of a datum T whereof the coordinates are:

$$\left\{ t_{IJ} = \frac{y_{(J)}}{r_{IJ}} + s_{IJ} \right\}_{I,J}$$

It is clear that the method is adapted to use of a secure component integrated on a client-unit, this component being supposed to have minimal calculation capacity. In fact, the secure component 30 only conducts simple operations, that is, addition and multiplication.

During a step 2200, the client-unit retrieves from the server-unit the reference datum $x_c$ indexed by c, in scrambled form, that is, retrieves:

$$(\widetilde{x_1^c} \| \alpha_1, \ldots, \widetilde{x_m^c} \| \alpha_m).$$

Advantageously, this step is conducted by oblivious transfer.

An oblivious transfer is a calculation operation between two parties P1 and P2. In this type of operation, P1 has a list of N elements indexed $X_i$, and P2 knows the number N of elements of the list and selects an index i between 0 and N−1. Via oblivious transfer P2 retrieves the $i^{th}$ element of P1, that is, the element of P1 indexed by i.

P1 learns no information on the index of the element retrieved by P2.

P2 per se retrieves no information on the other elements of the list held by P1.

In the present case, the client-unit has an index c of a datum held by the server-unit, and retrieves the data $\tilde{x}_c$ and $\alpha_c$ indexed by the index c, by oblivious transfer of the type $OT_N^1$ (that is, it retrieves a datum from N data held by the client unit).

On completion of this step, the client-unit has therefore retrieved the data $\tilde{x}_c$ and $\alpha_c$ without learning information on the others data held by the server-unit, and the server-unit has learnt nothing. In particular, it has learnt no information on the datum y held by the client-unit or on the index c which it has.

It is clear that the oblivious transfer is the sole exchange between the client-unit and the server-unit, ensuring the confidentiality of data from the two units.

Finally, from data acquired during steps 2100 and 2200 the client-unit performs during a step 2300 calculation of the function $f(x_c, y)$, between the reference datum indexed by c and the datum y held by the client-unit.

For this, it calculates from said data the sum of the term of the function dependent only on the variable $x_c$ and the polynomial, this sum being obtained by performing the following calculation:

$$\sum_{I,J} e_{IJ} x_{(ij)}^{\tilde{\epsilon}} t_{IJ} - \alpha_c$$

Finally, the client-unit determines the result of the function f by summing to the previous term the term $f_2(y)$ dependent only on the variable y and calculated during step 1400.

Figure 3:
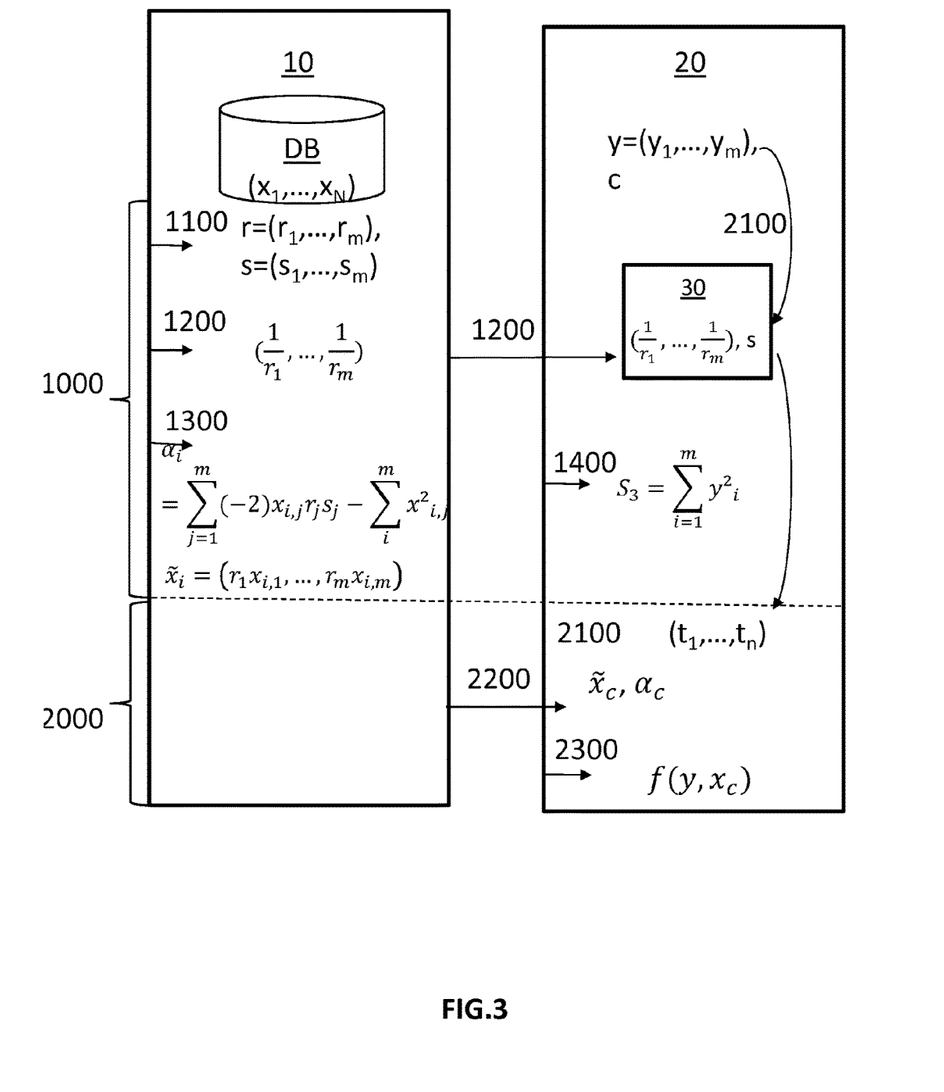
FIG. 3 illustrates a particular embodiment of a processing method of FIG. 2, in a system of FIG. 1.

In reference to FIG. 3, the particular case of executing the processing method of FIG. 2, applied to a case comprising calculation of the Euclidian distance between the datum y held by the client-unit and one of the reference data will now be described.

The Euclidian distance is expressed:

$$f(X, Y) = \left(\sum_{i=1}^{m}(X_i - Y_i)^2\right)^{1/2} = \left(\sum_{i=1}^{m}X_i^2 + \sum_{i=1}^{m}Y_i^2 - 2\sum_{1 \le i \le m}X_i Y_i\right)^{1/2}$$

It is therefore evident that the square of the Euclidian distance can be calculated by executing the method described hereinabove, this square comprising:
  a term $f_1(X)$ dependent only on the datum X, $f_1(X) = \sum_{i=1}^{m} X_i^2$,
  a term $f_2(Y)$ dependent only on the variable Y, $f_2(Y) = \sum_{i=1}^{m} Y_i^2$, and
  a polynomial having as variables the data X and Y, such that all the monomials of the polynomial comprise at least one coordinate of each datum: $f_3(X,Y) = -2\sum_{i=1}^{m} X_i Y_i$.

On completion of the processing method, it therefore suffices to calculate the square root of the sum of the three terms to obtain the Euclidian distance.

According to the first embodiment described hereinabove, during the initialisation step 1000, the generation step 1100 of masking data comprises generation, for each reference datum $x^l$, of two data $r=(r_1, \ldots, r_m) \in (\mathbb{Z}_p)^m$ and $s=(s_1, \ldots, s_m) \in (\mathbb{Z}_p)^m$, each comprising m coordinates belonging to the set of modular integers. The initialisation step 1200 of the secure component by the server-unit comprises insertion, by the server-unit, into the secure component, of a key $$\left(\frac{1}{r_1}, \ldots, \frac{1}{r_m}\right),$$

whereof the coordinates are the inverse of the coordinates of the datum r, and of the datum s. The server-unit then integrates the secure component 30 into the client-unit 20.

According to the second embodiment, the server-unit initialises the secure component during a step 1050 by loading an initialisation key of the generator of pseudo-random numbers and inserts the component into the client-unit.

Next the step 1100' comprises generation of data s and r or r*, and deduction respectively by the secure component of r* or by the server-unit of r.

From masking data obtained in step 1100, the server-unit scrambles, during step 1300, all the reference data of the base, by calculating for each reference datum $x^l$ a datum $\widetilde{x^l} = \{x_1^l r_1, \ldots, x_m^l r_m\}$ and a coefficient:

$$\alpha_i = \sum_{j=1}^{m}(-2)x_{i,j} r_j s_j - \sum_{i=1}^{m}(x_{i,j}^2)$$

The server-unit therefore obtains a set of N data $(\alpha_1, \ldots, \alpha_N)$ and N data $(\widetilde{x^1}, \ldots \widetilde{x^N})$.

Initialisation finally comprises, on the client unit side, calculation 1400 of the quadratic sum of the coordinates of the datum y, $f_2(y) = \sum_{i=1}^{m} y_i^2$, corresponding to the term of the square of the Euclidian distance dependent only on the datum y.

Next, during the execution step of the calculation, the step 2100 comprises communication, by the client-unit, with the secure element of all the coordinates $y_i$ of its datum y. From these data, the secure element calculates, for all the coordinates $y_i$, a value $$t_i = \frac{y_i}{r_i} + s_i$$

and sends it back to the client unit.

During step 2200 the client-unit then carries out an oblivious transfer with the server-unit to retrieve the data $\tilde{x}_c$ and $\alpha_c$.

From data obtained, the client-unit can therefore calculate during step 2300 the squared Euclidian distance $f(y, x_c)$ between its datum y and the datum $x_c$ of the base. First of all, it calculates the sum $$\left(\sum_{i=1}^{m}(-2)\tilde{x}_i^c t_i\right) - \alpha_c = \sum_{i=1}^{m}(-2)r_i x_i^c\left(\frac{y_i}{r_i} + s_i\right) - \sum_{i=1}^{m}(-2)x_i^c r_i s_i + \sum_{i=1}^{m}(x_i^c)^2 =$$

$$\sum_{i=1}^{m}(-2)x_i^c y_i + \sum_{i=1}^{m}(x_i^c)^2$$

Summing these terms with $f_2(y)$ gives:

$$\sum_{i=1}^{m}(-2)x_i^c y_i + \sum_{i=1}^{m}(x_i^c)^2 + \sum_{i=1}^{m}(y_i)^2 = \sum_{i=1}^{m}(x_i^c - y_i)^2$$

In determining the square root of the obtained sum, the client-unit therefore obtains the Euclidian distance between y and the datum $x_c$.

As indicated hereinabove, this method applies to biometry and can especially be used for identification or authentication of an individual. In this case, the method further comprises a comparison step of each Euclidian distance calculated between the datum y of the individual and one of the data of the server-unit with a predetermined threshold ϵ. If, for a datum of the base the calculated Euclidian distance is under said threshold, or, in the event where several data verify this property, for the datum whereof the Euclidian distance is minimal, the individual is recognised as being the individual from whom the datum of the corresponding base was obtained.

The proposed method therefore enables a unit to obtain a Euclidian distance between its datum and a confidential datum remotely stored, by learning nothing on the data of the server-unit.

In this case, this ensures confidentiality of biometric data of different individuals.

The invention claimed is:

1. A method for authentication or identification of an individual by comparing an acquired biometric datum (y) of the individual to at least one biometric reference data ($x_1, \ldots, x_N$) acquired on listed individuals, wherein said comparing is carried out by a secure data-processing system including:
   a) a server-unit (10) including a processor and storing the biometric reference data ($x_1, \ldots, x_N$) in a server memory,
   b) a client-unit (20) including a processor and storing the biometric datum (y), and an index c of the at least one biometric reference data ($x_1, \ldots, x_N$) in a client memory, and
   c) a secure component (30), wherein said secure component is an integrated circuit card including a secure component memory,
   the method comprising:
   calculating a function (f) between the biometric datum (y) and the at least one biometric reference data ($x_1, \ldots, x_N$) indexed by an index c, the function (f) expressed as a sum of:
      a term ($f_2$) dependent only on the biometric datum (y),
      a term ($f_1$) dependent only on the biometric reference data ($x_1, \ldots, x_N$), and
      a polynomial term having variables which are coordinates of the biometric datum (y) and the biometric reference data ($x_i, \ldots, x_N$) indexed by the index c, such that each monomial of the polynomial term includes at least one coordinate of each of the biometric datum (y) and the biometric reference data ($x_1, \ldots, x_N$) indexed by the index c,
   the method further including an initialization step (1000) comprising:
      i) generating (1100) masking data by the server-unit (10), or jointly by the server-unit (10) and the secure component (30),
      ii) integrating (1200) the secure component (30) into the client-unit (20),
      iii) scrambling (1300) the biometric reference data ($x_1, \ldots x_N$) by the server-unit using said masking data, and
      iv) calculating (1400), by the client-unit (20), the term ($f_2$) dependent only on the biometric datum (y),
   the method further including execution (2000) steps for calculating the function (f) comprising:
      the client-unit (20) sending (2100) the coordinates of the biometric datum (y) to the secure component, which returns the coordinates as masked using the masking data,
      the client-unit retrieving (2200) from the server-unit the biometric reference data ($x_1, \ldots, x_N$) indexed by the index c scrambled by the masking data, and
      from data obtained from the secure component and the server-unit, the client-unit calculating (2300) the sum of the term ($f_1$) dependent only on the biometric reference data, and the polynomial term, and adding to said sum the term ($f_2$) dependent only to the biometric datum to obtain the result of the function (f),
   wherein when said result is less than a predetermined threshold, said result is considered to be that of the individual.

2. The method according to claim 1, wherein the function is the squared Euclidian distance between the datum to be compared (y) and the biometric reference data indexed by the index c.

3. The method according to claim 1, wherein the masking data are generated randomly, by the secure component (30) and/or the server-unit (10), the masking data integrated to the secure component comprising a first set s and a second set r, and the masking data held by the server-unit comprising the first set s, and a third set having elements which are the inverse of the elements of the set r.

4. The method according to claim 1, wherein the recovery step (2200), by the client-unit (20), of the reference datum indexed by the index c scrambled from masking data is conducted by oblivious transfer.

5. The method according to claim 1, wherein the biometric reference data ($x_1, \ldots, x_N$) and the datum (y) to be compared are biometric data resulting from the digital acquisition of biometric traits of individuals.

6. The method according to claim 1, further comprising initializing said secure component, said initializing including:
   randomly generating a set of data r and a set of data s, such that the server-unit (10) stores said data r and said data s and the secure component (30) stores said data s, and a set of data elements which are the inverse of the elements of the data r, and
   integrating said secure component into a processing unit forming a client-unit of the server-unit.

7. A data-processing method executed by a processing unit (10) holding N reference data ($x_1, \ldots, x_N$), for execution of the processing method according to claim 1, during which said server unit processor:

inserts said masking data into the secure component, or loads onto the secure component an initialization key enabling generation by the secure component of pseudo-random numbers (1050), and scrambles (1300) the biometric reference data from said masking data.

8. The system for authentication or identification according to claim 1, wherein the client-unit is an electronic device personal to the individual to be identified or authenticated, and the secure component (30) is a smart card.

9. A non-transitory computer program product comprising program code instructions for executing a method for authentication or identification of an individual by comparing an acquired biometric datum (y) of the individual to at least one biometric reference data $(x_1, \ldots, x_N)$ acquired on listed individuals wherein said comparing is carried out by a secure data-processing system including:

a) a server-unit (10) including a processor and storing the biometric reference data $(x_1, \ldots x_N)$ in a server memory, b) a client-unit (20) including a processor and storing the biometric datum (y), and an index c of the at least one biometric reference data $(x_1, \ldots x_N)$ in a client memory, and c) a secure component (30), wherein said secure component is an integrated circuit card including a secure component memory, the method comprising:

calculating a function (f) between the biometric datum (y) and the at least one biometric reference data $(x_1, \ldots x_N)$ indexed by an index c, the function (f) expressed as a sum of:

a term $(f_2)$ dependent only on the biometric datum (y), a term $(f_1)$ dependent only on the biometric reference data $(x_1, \ldots x_N)$, and a polynomial term having variables which are coordinates of the biometric datum (y) and the biometric reference data $(x_1, \ldots x_N)$ indexed by the index c, such that each monomial of the polynomial term includes at least one coordinate of each of the biometric datum (y) and the biometric reference data $(x_1, \ldots x_N)$ indexed by the index c, the method further including an initialization step (1000) comprising:

i) generating (1100) masking data by the server-unit (10), or jointly by the server-unit (10) and the secure component (30), ii) integrating (1200) the secure component (30) into the client-unit (20), iii) scrambling (1300) the biometric reference data $(x_1, \ldots x_N)$ by the server-unit using said masking data, and iv) calculating (1400), by the client-unit (20), the term $(f_2)$ dependent only on the biometric datum (y), the method further including execution (2000) steps for calculating the function (f) comprising:

the client-unit (20) sending (2100) the coordinates of the biometric datum (y) to the secure component, which returns the coordinates as masked using the masking data, the client-unit retrieving (2200) from the server-unit the biometric reference data $(x_1, \ldots x_N)$ indexed by the index c scrambled by the masking data, and from data obtained from the secure component and the server-unit, the client-unit calculating (2300) the sum of the term (f1) dependent only on the biometric reference data, and the polynomial term, and adding to said sum the term (f2) dependent only to the biometric datum to obtain the result of the function (f), wherein when said result is less than a predetermined threshold, said result is considered to be that of the individual.

\* \* \* \* \*